United States Patent Office 2,976,562
Patented Mar. 28, 1961

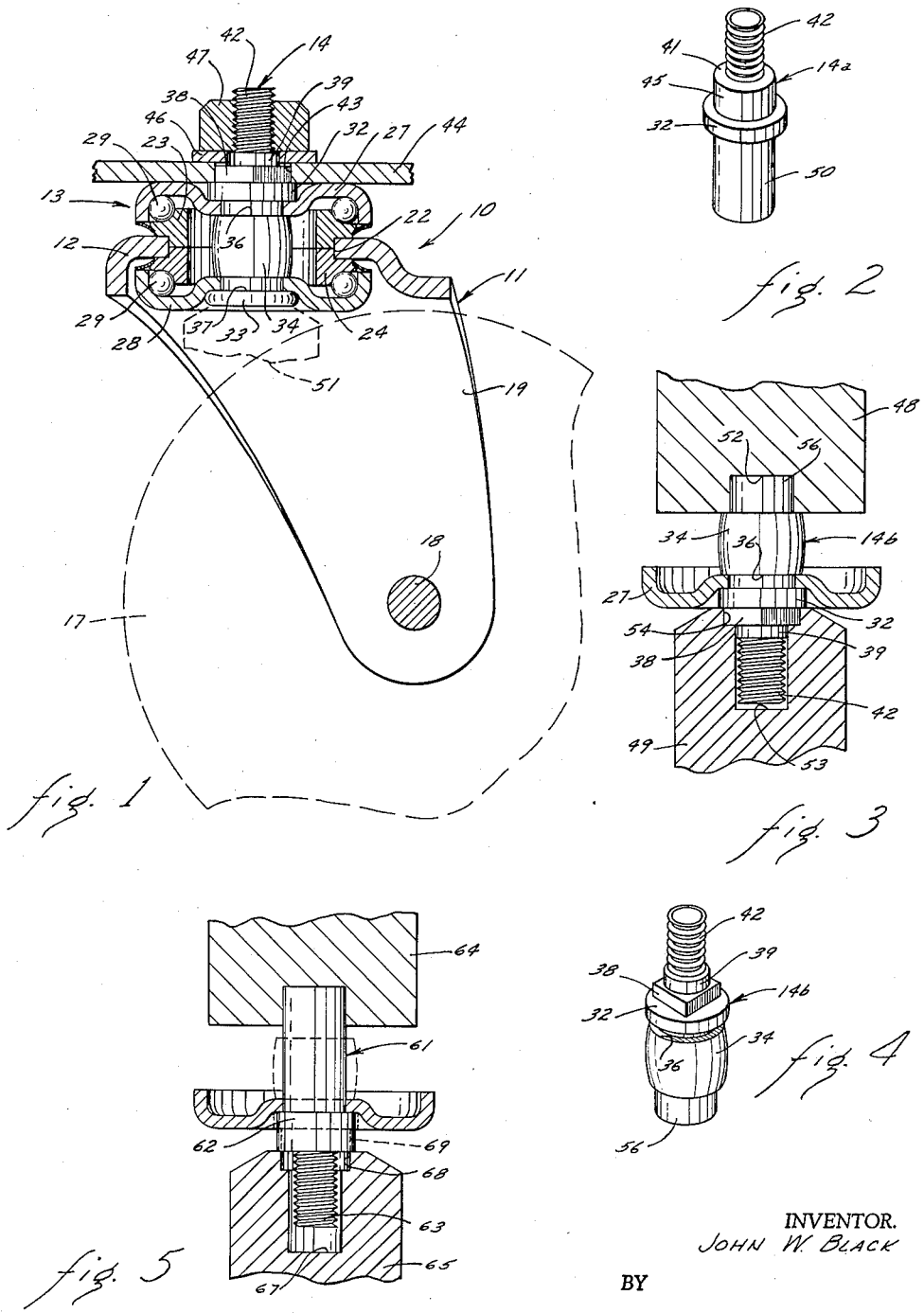

2,976,562

CASTER SPINDLE ASSEMBLY AND METHOD OF FORMING SAME

John W. Black, Prairieville Township, Barry County, Mich., assignor to Pemco Wheel Company, Kalamazoo, Mich., a corporation of Michigan Filed Nov. 10, 1958, Ser. No. 773,012

3 Claims. (Cl. 16—21)

This invention relates to a spindle construction for a caster having an anti-friction swivel bearing assembly and to a method for shaping and assembling said spindle both with respect to the bearing assembly and a member to which said spindle is connected for mounting the caster. This application is a continuation-in-part of my patent application Serial Number 658,627, entitled "Caster Yoke and Spindle Assembly" and now abandoned.

Casters having anti-friction swivel bearing assemblies for connecting the spindle to the wheel supporting yoke have been in common use for a great many years. Moreover, the concept of threading the upper end of the caster spindle, inserting the threaded end through an opening in a mounting plate and then securing the spindle with respect to the mounting plate by engaging the threaded end of the spindle with a nut, is also well-known in the art. However, where the threaded spindle is required, it has been very difficult to hold the spindle both while the swivel bearing is being assembled upon the spindle and while the spindle, hence the caster, is being mounted upon the member, such as a mounting plate, to which the caster is secured.

More specifically, where the bearing assembly is mounted upon and with respect to the caster spindle, as it often is by one or more forging operations, it has been very difficult to hold the spindle and/or the rings defining the bearing raceways during these forging operations. Where the spindle has been firmly gripped, distortion of the threads on the spindle has not been uncommon. Where the spindle has been loosely held, in order to protect the threads thereon, the spindle is sometimes moved with respect to the other elements in the caster during the forging operation so that the completed caster construction is often inaccurate and unacceptable. In fact, such movement may also result in damaged threads on the spindle even though it is loosely held to avoid such damage.

Where, as shown in my co-pending application Serial No. 678,287, entitled "Mechanical Device," a pair of bearing retainer rings are rigidly secured to the spindle by a series of forging operations, a loosely held spindle during such forging operations often results in a nonparallel relationship between the planes defined by the two retainer rings. In order to avoid the binding in the bearing which can result from this non-parallel condition, the bearing assembly is often constructed with excess tolerances. However, this compensation produces the further problem of a loose bearing assembly in which a few of the bearing balls tend to support the entire load at any given time. Furthermore, a sudden shock load applied to the casters will often cause the loaded bearing balls to be damaged or to dent the raceways.

If the threads on the spindle are damaged during the forging operation, it becomes very difficult to rethread the spindle because of a lack of gripping means which will not distort, loosen or otherwise damage the bearing assembly on the spindle. For substantially the same reason, namely, inability to properly grip the combined spindle and bearing assembly after assembly thereof, it is also very difficult to hold the spindle while it is being mounted with respect to a mounting member, such as a mounting plate. That is, it is very difficult to prevent the spindle from turning with the nut or other threaded means with which the spindle is engaged for the purpose of securing it to the mounting plate. Efforts have been made to overcome this problem by providing distortions, such as notches, openings or the like in the rings or other casings enclosing the bearing assembly, which distortions are engaged by a tool to hold the spindle. However, such procedure is unsatisfactory because it tends to create weaknesses in the bearing structure, it provides oil leakage points, it necessitates special tools, and its use tends to weaken the connection between the spindle and the yoke, after which relative rotation therebetween occurs and defeats the purpose of the distortions.

Excessive loads placed upon a caster, or vibrations which are developed in a caster during its normal operation, often tend to loosen the spindle with respect to its mounting plate. Unless it is promptly tightened, the threaded portion of the spindle is often damaged so that it not only cannot be tightened but also cannot be removed from the mounting member unless special and injurious tools, such as a hack saw, are used. Continued use of the loose caster subjects it to abnormal strains which usually result in a premature failure, thereby immobilizing the object, such as a shopping cart, which the caster supports.

More specifically, the loosened caster will tend to chuck and wobble with respect to the mounting member until the bearing assembly becomes loosened with respect to the spindle. Accordingly it is practically impossible to hold the spindle tightly enough to move the nut from the threaded stem of the caster, even where said distortions and special tools therefor are available. Thus, it may still be necessary either to cut the spindle by using a hack saw or replace both the caster and the mounting plate, which plate in many instances is rigidly secured to the body of the object which the caster supports. Often the removal of the caster is so difficult that it cannot be handled even by capable maintenance personnel and the entire assembly must be sent back to the factory. Furthermore, the loosened caster is less efficient in operation immediately prior to its complete failure and, where used, on shopping carts, creates a bad impression on customers.

Special reference to a shopping cart is made for illustrative purposes only and, therefore, is not intended to limit the scope of the invention. It will be apparent that a caster construction of the type disclosed herein can be used for a variety of different purposes.

Accordingly, a primary object of this invention has been the provision of a spindle assembly for a swivel caster wherein the spindle has positive engaging means which can be formed during the forging operation utilized to assemble the swivel bearing upon the spindle, which can be used to hold the spindle while the sequence of the forging operations required can be completed without damaging the threaded portion of the spindle, and which can be engaged by cooperating means on the caster mounting member for holding the spindle against rotation while the spindle, hence the caster, is being secured to the mounting member by means such as a nut.

A further object of this invention has been the provision of a caster construction, as aforesaid, which positively resists rotational movement between the spindle and the mounting member to which the spindle is secured for the purpose of mounting the caster with respect to the object which it supports.

A further object of this invention has been the provision of a spindle construction for a caster having an anti-friction bearing assembly connecting the spindle to the wheel supporting yoke, wherein said spindle is shaped to rigidly and non-rotatably engage the bearing assembly by a series of forging operations which work-harden the spindle, thereby reducing the need for heat treating and providing a strong construction capable of long maintenance-free operation in which the bearing planes are accurately held in spaced and parallel relationship with each other.

A further object of this invention has been the provision of a method whereby the above-mentioned structural advantages can be effected, which method can be carried out by any person capable of performing simple cold forging and/or staking operations, which insures accurate forging operations, which materially reduces the damage and inaccuracies which presently occur while fabricating caster constructions of this general type, and which insures easy initial assembly and replacement assembly by unskilled personnel without the need of special tools.

A further object of this invention has been the provision of a method for shaping and assembling a spindle with respect to a bearing assembly which method can be easily adapted to production operations, reduces rejects and is economical to carry out and easy to perform.

Other objects and purposes of this invention will become apparent to persons familiar with this type of equipment upon reading the following specification and examining the accompanying drawings, in which:

Figure 1 is a central cross-sectional view of a caster construction embodying the invention.

Figure 2 is a perspective view of spindle preform for a caster prior to its shaping and assembly upon and with respect to the remainder of the caster including the swivel bearing assembly.

Figure 3 is an inverted, side elevational view of the spindle preform shown in Figure 2 after a forging operation has been performed thereon and including the dies of a press brake, for example, for effecting the forging operation.

Figure 4 is a perspective view of the spindle preform shown in Figure 3 with all of the parts removed therefrom.

Figure 5 is an inverted, side elevational view of an alternate spindle preform shown with a portion of a bearing assembly prior to the performance of a forging operation thereon.

For convenience in description, the terms "upper," "lower" and derivatives thereof will have reference to the caster construction embodying the invention and parts thereof in their normal position of use and as appearing in Figure 1. The terms "inner," "outer" and derivatives thereof will have reference to the geometric center of the caster construction and parts thereof.

*General description*

The objects of the invention, including those set forth above, have been met by providing a method for producing a caster construction comprising a spindle secured to and supporting a bearing assembly which in turn pivotally supports the wheel engaging yoke of the caster. Accordingly, the method will be disclosed in terms of one particular structure which can be produced by carrying out the method. However, it will be understood that other structures can be constructed within the teaching of the method.

Said one structure includes a spindle, which is rigidly secured with respect to the casing elements of the bearing assembly by a series of forging operations which deform and/or upset portions of the material in the spindle to effect such securement. Said spindle is provided during the forging operations with an out-of-round portion which by concurrent assembly is disposed adjacent to the bearing assembly for reception through a corresponding hole of substantially the same size and shape in a mounting member to which the spindle is secured by engagement with threaded means, such as a nut.

The method of the invention pertains to this deforming of the spindle by one forging operation for the purpose of effecting engagement thereof with part of the bearing assembly and simultaneously producing the out-of-round contour which permits easy and undamaging engagement of the spindle during subsequent forging operations which complete the method. The out-of-round portion in said spindle serves to prevent rotation of the spindle with respect to said mounting member when said spindle is being engaged by threaded means, such as a nut, for securing said caster to said mounting member.

*Detailed description*

The caster construction 10 (Figure 1), herein selected to illustrate one preferred embodiment of the invention which can be constructed by carrying out the method of the invention, is comprised of a wheel supporting yoke 11 having a swivel plate 12 pivotally supported by means of the bearing assembly 13 upon the spindle 14. For a detailed disclosure of that portion of the caster construction including the yoke 11, the bearing assembly 13 and the wheels 17, reference is made to said co-pending application Serial No. 678,287. Briefly, the wheel 17 is rotatably supported upon an axle 18 which is supported upon and between the legs of the yoke 11, one such leg being shown at 19.

The swivel plate 12 (Figure 1) of the yoke 11 has an opening 22 in which the lower end of the spindle 14 is coaxially disposed. A pair of thrust rings 23 and 24 are mounted upon opposite sides of the swivel plate 12 coaxially with and adjacent to said opening 22, said rings being spaced from said spindle 14. A pair of retainer rings 27 and 28 are disposed near to the thrust rings 23 and 24, respectively, on opposite sides of the swivel plate 12. A plurality of bearing balls 29 are disposed respectively between the thrust rings 23 and 24 and the corresponding retainer rings 27 and 28.

It is believed that the method of the invention can best be disclosed by describing a caster structure including a spindle construction formed and assembled according to the teachings of the method. Thus, the caster structure 10 hereinafter described has been selected solely for illustrative purposes and it not intended to limit the scope of the method.

The spindle 14 in its completed form, as shown in Figure 1, has an external annular flange 32 which is preferably disposed approximately midway between the axial ends of the spindle, and an integral annular flange 33 which is disposed at the lower end of said spindle. The spindle 14 also has an integral, radially enlarged portion 34 disposed between the flanges 32 and 33 and spaced therefrom to provide the annular grooves 36 and 37 in which the retainer rings 27 and 28 are coaxially and rigidly held. Said spindle 14 has an out-of-round portion 38 adjacent to the flange 32 on the opposite side thereof from the groove 36, which portion 38 is square in this particular embodiment. However, it will be recognized that said out-of-round portion 38 may be hexagonal or even free form within the invention. Said spindle 14 has a cylindrical portion 39 of reduced diameter adjacent to said out-of-round portion which separates said out-of-round portion from a threaded stem 42 which is preferably slightly smaller in outside diameter than said cylindrical portion 39.

The out-of-round portion 38 of the spindle 14 is snugly and slidably receivable into a corresponding opening 43 in the mounting member 44 which, in this particular embodiment, is a flat plate. A washer 46 encircles the cylindrical portion 39 and a nut 47 threadedly engages the threaded stem 42, whereby the flange 32 is held snugly against the lower surface of the mounting member 44. It will be recognized that the mounting member may, under some circumstances, be the lower end of a hollow leg in which an out-of-round portion is provided to slidably but non-rotatably receive the out-of-round portion 38 on the spindle 14.

The spindle 14 (Figure 1) is formed, according to the teachings of the method set forth herein, from the spindle preform 14a (Figure 2) which includes the threaded stem 42 and the central flange 32. During the first forging operation in one embodiment of the invention, the spindle preform 14a is shaped by the dies 48 and 49 so that it takes on the form shown at 14b in Figures 3 and 4. More specifically, the partially completed spindle 14b includes the enlarged portion 34, the out-of-round portion 38 and the reduced cylindrical portion 39. The cavity 53 in the lower die 49 has an enlarged, out-of-round portion 54 adjacent to its upper end which, in this embodiment, is square in cross section and has an inscribed circle substantially equal in diameter to the outside diameter of the port 45 of the preform 14a between the threaded stem 43 and the flange 32. The out-of-round portion 38 is formed by the enlarged portion 54 in the die cavity 53. The upper and lower dies 48 and 49 may be mounted upon means, such as a conventional press brake (not shown). The final forming of the spindle 14, which produces the flange 33, may be accomplished by means including the lower die 49 of Figure 3 and the die 51 shown in the broken lines in Figure 1.

*Assembly and operation*

The shaping and assembly of the spindle 14 with the remainder of the caster 10 (Figure 1) is normally conducted in a series of operations whereby the spindle preform 14a (Figure 2) is transformed into a partial preform 14b (Figure 3) and then into the completed spindle 14. The assembled spindle 14 is secured with respect to the mounting plate 44 by means of the nut 27. More specifically, the lower end portion 50 of the spindle preform 14a (Figure 2) is first inserted through the opening in the upper retainer ring 27 (Figure 3) until said ring 27 is against and resting upon the upper (lower in Figure 3) surface of said flange 32. The opening in the retainer ring 27 is so designed that it will snugly but slidably embrace the lower end portion 50 of the spindle preform 14a. The threaded end 42 of the spindle preform 14a is inserted into the cavity 53 in the lower die 49 so that the part 45 of the preform 14a is snugly received into the enlarged, out-of-round portion 54 of the cavity 53. As a result, the stem 42 is held spaced from and concentric with the walls defining the cavity 53. Moreover, the upwardly extending, lower portion 50 of the preform 14a is aligned with and slidably receivable into the cavity 52 in the upper die 48.

The depth and diameter of the cavity 52 are such that it will snugly engage only the lower part of the portion 50 when said upper and lower dies are moved toward each other. Accordingly, when sufficient opposing forces are applied to the upper and lower dies 48 and 49, respectively, thereby causing them to move toward each other, two operations are simultaneously performed upon the spindle preform 14a of Figure 2 to convert it into the partially completed spindle 14b shown in Figures 3 and 4. In the first place, some of the metal in the part 45 of the preform 14a adjacent to the threaded stem 42 (Figure 2) is upset by the lower die 49 (Figure 3) so that it flows radially outwardly into the out-of-round enlargement 54 in said lower die to provide the out-of-round portion 38 in the spindle 14b. At the same time, the portion 38 and the cylindrical portion 39 of reduced diameter are formed where the part 45 previously existed. In the second place, the dies axially compress and radially expand that part of the lower portion 50 of the spindle preform 14a disposed between the upper die 48 and the lower surface of the upper retainer ring 27 to form the enlarged portion 34 which thereby forms the groove 36 in which the upper retainer ring 27 is rigidly held.

It will be apparent that it will be necessary to hold the upper retainer ring 27 snugly against the flange 32 while the above-described operation is performed. This may be accomplished primarily by gravity where the spindle preform 14a is inverted during the forging operations, as set forth above. However, the upper retainer ring 27 may be frictionally held against the flange 32 by providing small irregularities upon the surface of the spindle preform 14a adjacent to the lower surface of the flange 32. In such case, the first forging operation can be performed with the spindle preform 14a in its Figure 2 position and, therefore, the positions of the upper and lower dies 48 and 49, respectively, as appearing in Figure 3, would be reversed.

While holding the partially completed spindle 14b in its inverted position, as it is appearing in Figure 3, the bearing balls 29, the thrust rings 23 and 24, and the yoke 11 are assembled upon and with respect to the upper retainer ring 27. The lower retainer ring 28 is then sleeved upon the lower, undistorted portion 56 of the spindle 14b until it engages the enlarged portion 34. A staking die, for example, such as the die indicated in Figure 1, is pressed against the axial end of the lower portion 56 of the partially completed spindle 14b to create the lower flange 33, hence the lower annular groove 37 whereby and in which the retainer ring 28 is rigidly secured.

Because the upper end of the partially completed spindle 14b is snugly and positively held within the lower die 49 during the staking operation one of the major problems in producing caster constructions of this type is overcome. That is, the spindle preform 14b is positively held against radial shifting during the staking operation, which shifting may damage the threads on the stem 42 or produce non-parallel bearing planes. Because of the accuracy with which the pressures applied during the staking operation can be controlled, the bearing tolerances, particularly between the opposing bearing ball engaging surfaces of the thrust rings and the retainer rings, can also be accurately controlled. Accordingly, a bearing assembly 13 having a minimum of looseness of unnecessary tolerance can be produced by the method of forming the stem and assembling the bearing assembly set forth above.

As shown in Figure 3, the threaded stem 42 will be spaced from the walls of the cavity 53 at the completion of the first forging operation. Thus, there may be some compression of the flange 32 during the staking operation. However, this can be compensated for, if desirable, by providing a flange 32 which is slightly oversize in axial thickness. Thus, when the formation of the spindle 14 is completed, the flange 32 is preferably substantially within a plane defined by the upper surface of the upper retainer ring 27 as appearing in Figure 1.

The wheel 17 is mounted upon the yoke 11 by means of the axle 18 in any convenient conventional manner.

Having completed the formation of the spindle 14, the upper end thereof is now inserted through the out-of-round opening 43 in the mounting member 44. A washer 48 encircles the cylindrical portion 39 of reduced diameter and a nut 47 threadedly engages the stem 42 for drawing the flange 32 snugly against the lower surface of the mounting member 44.

Because of the co-planar positions (Figure 1) of the upper surfaces of the upper flange 32 and upper retainer ring 27, the mounting member 44, which is a flat plate in this particular embodiment, will engage the upper surfaces of retainer ring 37 and flange 32, thereby reducing to a minimum the possibility of any tilting of the mounting member 44 with respect to the axis of the spindle 14.

*Alternate construction*

The spindle preform 61 (Figure 5) differs from the spindle preform 14a of Figure 2 in that the preform 61 has a flange 62 disposed directly adjacent the threaded stem 63. The first forging operation is performed upon the spindle preform 61 by means of upper and lower dies 64 and 65 which may be substantially similar to the upper and lower dies shown in Figure 3. The lower die 65 has a cavity 67 with an enlarged, out-of-round portion 68 at its upper end, the circumscribed circle of which is preferably about equal in diameter to the diameter of the flange 62. Thus, when the first forging operation is performed by means of the dies 64 and 65, the stem 63 is received into the cavity 67 and the lower portion of the flange 62, as appearing in Figure 5, is upset upwardly to increase the size of the upper portion of said flange while at the same time producing the out-of-round shank indicated in broken lines at 69 adjacent to the threaded stem 63. The first forging operation also changes the shape of the remainder of the preform 61 to produce a partially completed spindle which is not materially different from the spindle preform 16b in Figure 4, except that it does not have the cylindrical portion 39 adjacent to its threaded stem. The staking operation, which completes the shaping of a spindle from a preform 61, may be carried out as set forth above with respect to the staking of the partial preform 16b.

Under some circumstances it may be desirable to positively resist rotation of the bearing retainer rings 27 and 28 by means other than the friction created by the walls of the grooves 36 and 37. In such case, the opening in the retainer rings may be provided with out-of-round cross sections. Thus, when the forging operations are performed upon the spindle preform to provide the enlarged portion 34 and the lower flange 33, part of the material in the spindle will flow radially outwardly to conform with the shape of the openings in the retainer rings, thereby positively opposing relative rotation between the spindle and said retainer rings.

It will be seen from the above description that the basic concept of the method of the invention can be applied to different types of spindle preforms. Thus, it will be recognized that although the method of the invention has been illustrated by reference to particular, preferred caster constructions, the method may be utilized in forming and assembling other types of caster constructions including various types of spindle preforms. Furthermore, although particular preferred structures embodying the invention have been disclosed in detail above for illustrative purposes, it will be understood that variations or modifications of such disclosures, which lie within the scope of the appended claims, are fully contemplated.

What is claimed is:

1. A spindle construction for mounting a caster upon a support plate having an out-of-round opening, said caster having a wheel supporting yoke including a swivel plate engaged by anti-friction swivel bearings and having an opening therethrough, comprising: a bearing assembly including a pair of bearing ball retainer rings on opposite sides of said swivel plate and coaxial with said opening therethrough, said rings having parallel, radially inner edge portions; a spindle extending through said retainer rings, said spindle having a pair of spaced, annular grooves in which said inner edge portions are respectively disposed and rigidly held, and an out-of-round portion between the upper end of the spindle and the adjacent one of said grooves, said out-of-round portion defining an inscribed circle of less diameter than the diameter of the spindle between said out-of-round portion and said adjacent groove, said out-of-round portion being of substantially the same shape as said out-of-round opening and being snugly and non-rotatably disposable within said out-of-round opening; and means engageable with said upper end of said spindle for holding same against axial movement with respect to said member, whereby said retainer rings are positively held and positioned with respect to each other and said support plate.

2. The structure of claim 1 wherein the axial length of said out-of-round portion on said spindle is less than the thickness of the support plate adjacent to the out-of-round opening therein; wherein the upper end of said spindle is threaded and said engageable means includes a nut whereby said spindle is positively and releasably held against said axial movement with respect to said support plate; and wherein said out-of-round opening and said out-of-round portion have identical and regular geometric shapes.

3. A method for shaping a caster spindle for non-rotatable engagement with a mounting member having an out-of-round opening, and simultaneously assembling said spindle with a pair of coaxial, spaced bearing ball retainer rings, said spindle having a threaded stem of reduced diameter at one end thereof and an external, integral and annular flange spaced from said reduced portion of said spindle, the steps comprising: inserting the other end of said spindle through one of said retainer rings until said ring is engaged on one side by said flange; effecting an axial compression and radial expansion of said spindle between the other end of said spindle and said flange to form an annular enlargement adjacent to the other side of said one ring for rigidly holding said one ring against said flange and, simultaneously, upsetting a portion of said spindle between said reduced portion and said flange toward said flange to form an out-of-round cross-section adjacent to said flange, said out-of-round portion having the same contour as said opening in said mounting member; inserting said other end of said spindle through the other ring until said other ring is engaged on one side by said annular enlargement; upsetting said other end of said spindle against the other side of said other ring for rigidly holding said other ring against said enlargement and parallel with said one ring at a predetermined distance therefrom; inserting the threaded end portion of said spindle through said opening in said mounting member until said out-of-round portion is within said opening; and threadedly engaging said threaded stem with threaded means whereby said spindle is positively held against axial and rotational movement with respect to said mounting member.

References Cited in the file of this patent

UNITED STATES PATENTS

| | | |
|---|---|---|
| 1,180,830 | Diss | Apr. 25, 1916 |
| 1,885,990 | Chesnutt | Nov. 1, 1932 |
| 1,969,557 | Herold | Aug. 7, 1934 |
| 2,521,819 | Baer | Sept. 12, 1950 |
| 2,522,032 | Gerry | Sept. 12, 1950 |
| 2,565,665 | Reich | Aug. 28, 1951 |
| 2,589,847 | Noelting | Mar. 18, 1952 |